(12) United States Patent
Ladru et al.

(10) Patent No.: US 11,274,560 B2
(45) Date of Patent: Mar. 15, 2022

(54) SEALING SYSTEM FOR A ROTOR BLADE AND HOUSING

(71) Applicant: Siemens Aktiengesellschaft, Munich (DE)

(72) Inventors: Francis Ladru, Berlin (DE); Thorsten Schulz, Berlin (DE)

(73) Assignee: SIEMENS ENERGY GLOBAL GMBH & CO. KG

( * ) Notice: Subject to any disclaimer, the term of this patent is extended or adjusted under 35 U.S.C. 154(b) by 178 days.

(21) Appl. No.: 16/607,419

(22) PCT Filed: Mar. 21, 2018

(86) PCT No.: PCT/EP2018/057165
§ 371 (c)(1),
(2) Date: Oct. 23, 2019

(87) PCT Pub. No.: WO2018/197114
PCT Pub. Date: Nov. 1, 2018

(65) Prior Publication Data
US 2020/0123911 A1 Apr. 23, 2020

(30) Foreign Application Priority Data
Apr. 28, 2017 (DE) ...................... 10 2017 207 238.5

(51) Int. Cl.
*F01D 5/20* (2006.01)
(52) U.S. Cl.
CPC ............ *F01D 5/20* (2013.01); *F05D 2230/31* (2013.01); *F05D 2240/55* (2013.01);
(Continued)

(58) Field of Classification Search
CPC .......... F01D 5/20; F01D 5/288; F01D 11/122; C04B 35/48; C04B 35/62222;
(Continued)

(56) References Cited

U.S. PATENT DOCUMENTS

| 3,825,364 A | 7/1974 | Halila et al. |
| 4,269,903 A | 5/1981 | Clingman et al. |

(Continued)

FOREIGN PATENT DOCUMENTS

| CN | 104704200 A | 6/2015 |
| CN | 106232946 A | 12/2016 |

(Continued)

OTHER PUBLICATIONS

PCT International Search Report and Written Opinion of International Searching Authority dated Jun. 22, 2018 corresponding to PCT International Application No. PCT/EP2017/065493 filed Mar. 21, 2018.

(Continued)

*Primary Examiner* — Igor Kershteyn
(74) *Attorney, Agent, or Firm* — Schmeiser, Olsen & Watts LLP

(57) ABSTRACT

The invention relates to a ceramic sealing system between a rotor blade (120) and a housing (I). A small porous zirconium oxide layer (II) on a turbine rotor blade, which zirconium oxide layer faces a ceramic layer system (15', 15") of higher porosity, achieves durable sealing systems. The housing (I") has a metal substrate (7), a metal adhesion-promoting layer (10), and a thick, outer, ceramic layer (15', 15") based on zirconium oxide, in particular having a porosity 2≥14%.

17 Claims, 3 Drawing Sheets

(52) U.S. Cl.
CPC ..... *F05D 2300/2118* (2013.01); *F05D 2300/514* (2013.01); *F05D 2300/6111* (2013.01)

(58) Field of Classification Search
CPC ............... C04B 38/00; C04B 38/0074; C04B 2235/3244; C04B 2235/3246; C04B 2111/00551; C04B 2111/00525; C23C 28/3455; C23C 28/347; C23C 28/3215; F05D 2230/31; F05D 2240/55; F05D 2300/2118; F05D 2300/514; F05D 2300/6111
See application file for complete search history.

(56) References Cited

U.S. PATENT DOCUMENTS

| | | | |
|---|---|---|---|
| 4,289,446 A | 9/1981 | Wallace | |
| 5,320,909 A * | 6/1994 | Scharman | C23C 4/02 415/174.4 |
| 5,520,516 A * | 5/1996 | Taylor | C23C 4/02 416/241 B |
| 5,603,603 A * | 2/1997 | Benoit | F01D 11/12 415/173.4 |
| 5,645,399 A * | 7/1997 | Angus | F01D 11/18 415/177 |
| 5,830,586 A * | 11/1998 | Gray | C23C 4/134 428/621 |
| 5,834,471 A | 11/1998 | Duckworth et al. | |
| 5,912,087 A * | 6/1999 | Jackson | C23C 28/325 428/610 |
| 6,024,792 A | 2/2000 | Kurz et al. | |
| 6,190,124 B1 * | 2/2001 | Freling | C23C 28/3215 415/173.4 |
| 2003/0203224 A1 * | 10/2003 | DiConza | C23C 28/3215 428/472 |
| 2003/0207151 A1 | 11/2003 | Stamm | |
| 2004/0012152 A1 | 1/2004 | Grunke et al. | |
| 2007/0140840 A1 | 6/2007 | Schmitz et al. | |
| 2007/0274837 A1 | 11/2007 | Taylor et al. | |
| 2008/0166225 A1 | 7/2008 | Strangman et al. | |
| 2010/0009144 A1 | 1/2010 | Schumann et al. | |
| 2011/0164961 A1 | 7/2011 | Taylor | |
| 2012/0063888 A1 | 3/2012 | Strock et al. | |
| 2012/0087781 A1 | 4/2012 | Metscher | |
| 2013/0115479 A1 | 5/2013 | Stamm | |
| 2013/0330538 A1 | 12/2013 | Casu et al. | |
| 2015/0267544 A1 | 9/2015 | Gurt Santanach et al. | |
| 2015/0275678 A1 | 10/2015 | Bullinger et al. | |
| 2018/0015536 A1 | 1/2018 | Merrill et al. | |

FOREIGN PATENT DOCUMENTS

| | | |
|---|---|---|
| DE | 3023441 C2 | 7/1990 |
| DE | 10225532 C1 | 12/2003 |
| EP | 0486489 B1 | 11/1994 |
| EP | 0412397 B1 | 3/1998 |
| EP | 0892090 A1 | 1/1999 |
| EP | 0786017 B1 | 3/1999 |
| EP | 0712397 B1 | 4/1999 |
| EP | 0919699 A2 | 6/1999 |
| EP | 0765951 B1 | 12/2000 |
| EP | 1306454 A1 | 5/2003 |
| EP | 1319729 A1 | 6/2003 |
| EP | 1204776 B1 | 6/2004 |
| EP | 1541810 A1 | 6/2005 |
| EP | 1541810 A1 | 6/2005 |
| EP | 1731630 A2 | 12/2006 |
| EP | 1783248 A1 | 5/2007 |
| EP | 1967615 A1 | 9/2008 |
| EP | 2365106 A1 | 9/2011 |
| EP | 2407579 A1 | 1/2012 |
| EP | 2428593 | 3/2012 |
| EP | 2439379 A2 | 4/2012 |
| EP | 2614174 A1 | 7/2013 |
| EP | 2754733 A1 | 7/2014 |
| EP | 2002030 B1 | 9/2014 |
| EP | 2313615 B1 | 3/2016 |
| GB | 2059806 A | 4/1981 |
| GB | 2226050 A | 6/1990 |
| RU | 2015117610 A | 12/2016 |
| WO | 9967435 A1 | 12/1999 |
| WO | 1999067435 | 12/1999 |
| WO | WO 1999/067435 | 12/1999 |
| WO | 0044949 A1 | 8/2000 |
| WO | 2000044949 | 8/2000 |
| WO | WO 2000/044949 | 8/2000 |
| WO | 2005071228 A1 | 8/2005 |
| WO | 2010018174 A1 | 2/2010 |
| WO | WO 2010018174 A1 | 2/2010 |

OTHER PUBLICATIONS

Liao, Hongxing et al: "Effect of porosity of ceramic-coats and interface on lifetime and failure mechanism of thermal barrier coating"; Acta Materiae Compositae Sinica; vol. 33; No. 08; Dec. 1, 2015; Aug. 2016.

Dai, He et al: "Research and Prospect of Novel High-Temperature Thermal Resistant Abradable Sealing Coating"; Materials Reports, No. 07; Jul. 15, 2008.

Chinese Office Action for Application No. 201880028054.5, dated Jul. 1, 2021.

* cited by examiner

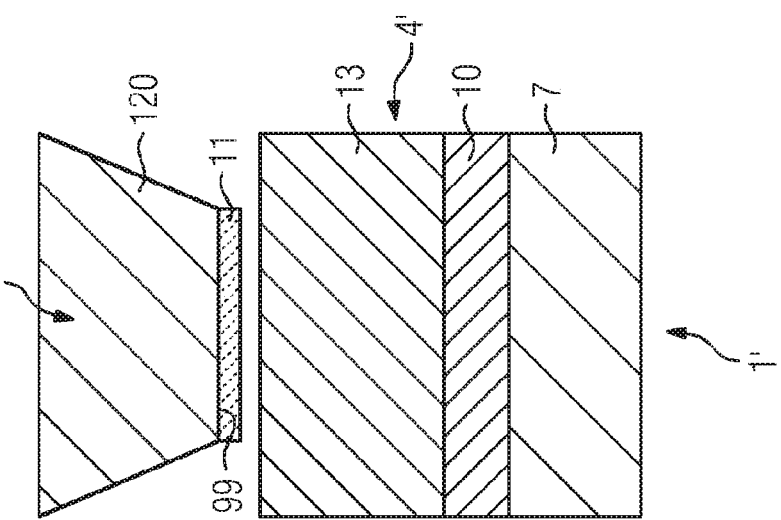
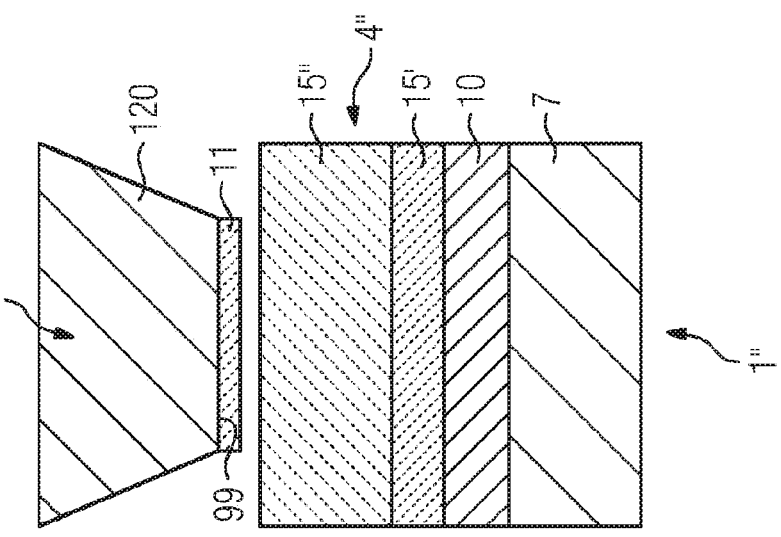
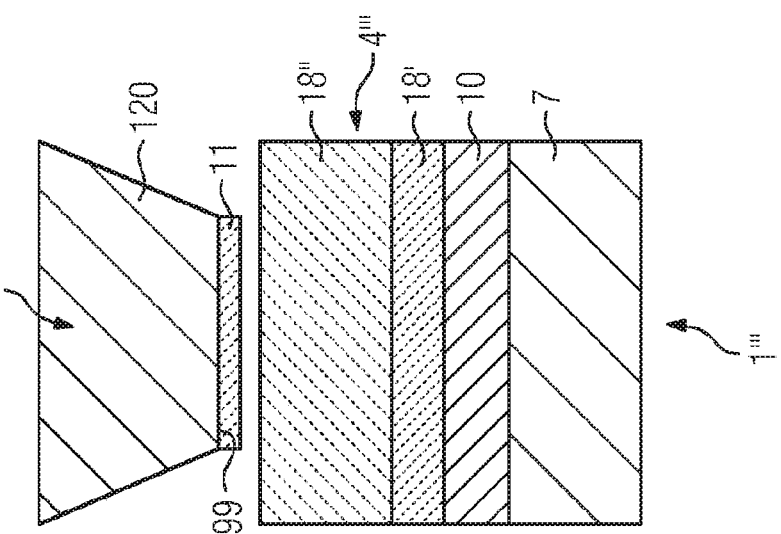

SEALING SYSTEM FOR A ROTOR BLADE AND HOUSING

CROSS-REFERENCE TO RELATED APPLICATIONS

This application claims priority to PCT Application No. PCT/EP2018/057165, having a filing date of Mar. 21, 2018 which is based off of DE Application No.10 2017 207 238.5, having a filing date of Apr. 28, 2017, the entire contents both of which are hereby incorporated by reference.

FIELD OF TECHNOLOGY

The following relates to ceramic sealing systems of turbine rotor blades and housings.

BACKGROUND

To optimize radial gaps within stationary gas turbines, use is made of "abradable coatings" which are intended to yield to the mechanical resistance of turbine rotor blade tips in terms of their thermal expansion and be abraded away, so that a furrow is formed within a ceramic coating.

The rotor blade material thereof has often been abraded away on the ceramic.

In aircraft engines, the blade tip is sometimes coated with cBN (cubic boron nitride) in order to achieve an abrasive action on the running-in layers. cBN is a very hard material which is very suitable for abrading away ceramic layers. However, it is not very heat resistant (decomposition in the presence of oxygen at below 1273 K), so that it is unsuitable for stationary gas turbines having unknown points in time of rubbing, since it burns away beforehand.

Other manufacturers of stationary gas turbines use "engineered surfaces". These layers have grooves introduced obliquely to the flow direction into the running-in layers so as to assist furrow formation. However, a consequence of this is that turbulence or pressure drops at the edges of the depressions have a negative effect on the performance of the machine.

SUMMARY

An aspect relates to solve the abovementioned problem.

BRIEF DESCRIPTION

Some of the embodiments will be described in detail, with reference to the following figures, wherein like designations denote like members, wherein:

FIG. 1 shows a first working example in which the turbine rotor blade as component for a rotor is located opposite the stator, a housing;

FIG. 2 shows a second working example in which the turbine rotor blade as component for a rotor is located opposite the stator, a housing;

FIG. 3 shows a third working example in which the turbine rotor blade as component for a rotor is located opposite the stator, a housing;

Figure 4:
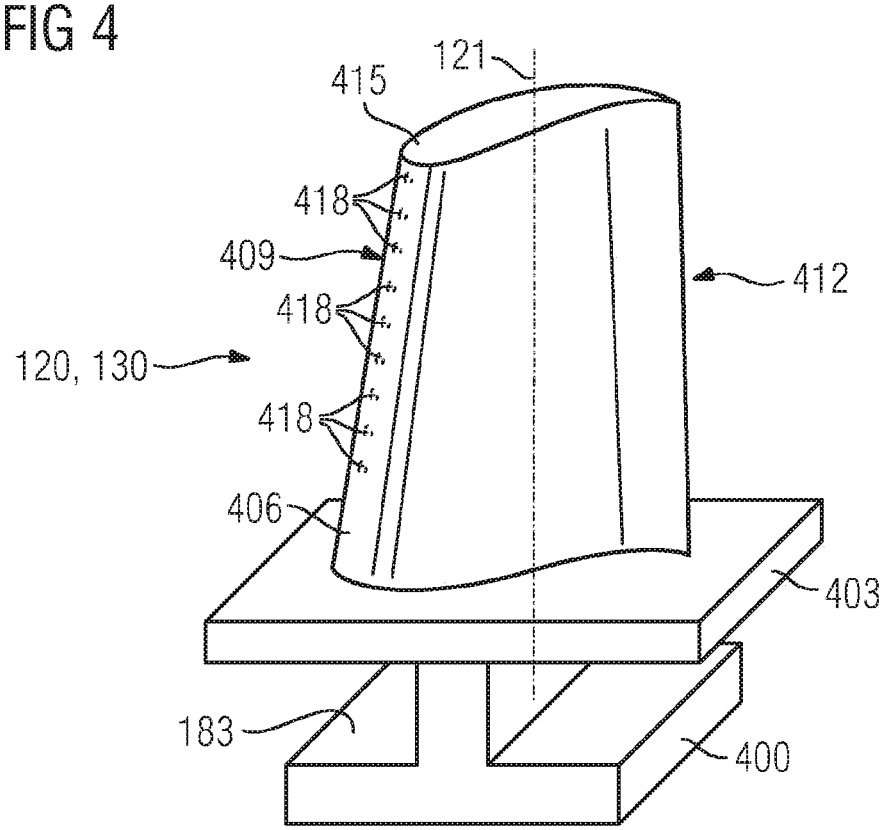
FIG. 4 shows a perspective view of a rotor blade or guide vane on a turbo machine.

The figures and the description present only working examples of embodiments of the invention.

DETAILED DESCRIPTION

FIG. 1 shows a first working example in which the turbine rotor blade 120 as component for a rotor 120 is located opposite the stator, a housing 1' (FIG. 1), 1", 1''' (FIG. 2, 3).

The turbine blade 120 as part of a rotor 120 generally has a nickel- or cobalt-based superalloy in the substrate and has appropriate protective layers on the blade platform and the blade airfoil 25 (FIG. 2, 3). These are metallic bonding layers and/or anticorrosion layers based on NiCoCrAlY, aluminides or platinum aluminides, in each case with a ceramic layer or ceramic layer system located thereabove (FIG. 1, 2, 3), in particular with a layer thickness of the ceramic layer of at least 300 μm.

Likewise, two-layer ceramic layer systems can be present on the blade airfoil 25, for example a lower partially stabilized zirconium oxide layer with a fully stabilized zirconium oxide layer located thereabove as outer layer, with or without segmentation, or a pyrochlorine layer having a ceramic bonding layer, in particular based on zirconium oxide.

A turbine blade tip 99 which is directly opposite the stator 1' (FIG. 1), 1", 1''' (FIG. 2, 3) is not provided with armoring. Here, embodiments of the invention proceeds in a different direction by a partially stabilized zirconium oxide layer 11 having a lower porosity, total of <8%, in particular <6%, being applied there, with an advantageous layer thickness in the range from 50 μm to 150 μm (FIG. 1, 2, 3).

The zirconium oxide layer 11 differs from the ceramic layer on the blade airfoil in terms of, in particular, number of layers, porosity (at least 10% difference) or composition (at least 10% or other stabilizer).

The layer system 4' located opposite on the housing 1' likewise has a substrate 7 with a metallic bond coat 10, based on NiCoCrAlY. The NiCoCrAlY layer has a layer thickness of from 180 μm to 300 μm.

A thick, outer partially stabilized zirconium oxide layer 13 is applied on top of the metallic bonding layer 10.

This ceramic layer 13 on the layer system 4' is a partially stabilized zirconium oxide layer having a porosity of >8%, in particular greater than 10%, and layer thicknesses of at least 1300 μm.

The porosity of this ceramic layer 13 is significantly higher and is 18%±4%.

The partial stabilization (FIG. 1, 2, 3) is achieved by means of yttrium oxide, but can also be achieved by means of other stabilizers such as calcium oxide, magnesium oxide, $Yb_2O_3$ or $Gd_2O_3$, where the proportion of yttrium oxide is advantageously 8%.

The layer thickness of the ceramic layer 13 is 1400 μm±10%.

FIG. 2 shows a further working example in which the turbine rotor blade 120 has the same protective coating on the blade airfoil 25, the blade platform and the zirconium oxide coating 11 on the tip 99.

On the other hand, the housing 1" as layer housing 4" has a two-layer ceramic coating 15', 15", likewise on a substrate 7 and a metallic bonding layer 10, as described in FIG. 1.

However, a ceramic bonding layer 15', 18' (FIG. 3) which has a porosity of 18%±4% but a layer thickness of not more than 500 μm, in particular from 300 μm 500 μm. The ceramic bonding layer 15', 18' (FIG. 3) is a partially stabilized zirconium oxide layer.

As thicker, at least twice as thick, outer ceramic layer 15", use is made of a fully stabilized zirconium oxide layer 15".

The stabilization is achieved by means of yttrium oxide but can also be achieved by means of other stabilizers (FIG. 1, 2, 3).

The proportion of the stabilizer yttrium oxide is from 20% to 48%.

The layer thickness of the thick outer ceramic layer 15", 18" (FIG. 2, 3) is 1000 µm.

FIG. 3 shows a further working example of embodiments of the invention.

The ceramic layer system 4''' on the ceramic layers 18', 18" likewise has two layers and likewise has a ceramic bonding layer 18', as described in FIG. 2.

On the other hand, the thicker, outer, ceramic layer 18" is partially stabilized, in particular by means of yttrium oxide, in particular 8%. The stabilization can likewise be achieved by means of other stabilizers.

However, the porosity of the outer, ceramic layer 18" is 24%±3%.

The novel aspect is firstly the strengthening of the rotor blade tips 99 by means of a high-temperature-capable and phase-stable material.

The ceramic layers are highly homogeneous porous layers.

FIG. 4 shows a perspective view of a rotor blade 120 or guide vane 130 on a turbo machine, which extends along a longitudinal axis 121.

The turbo machine can be a gas turbine of an aircraft or of a power station for generation of electricity, a steam turbine or a compressor.

The blade 120, 130 comprises, in order along the longitudinal axis 121, a fastening region 400, an adjoining blade platform 403 and also a blade airfoil 406 and a blade tip 415.

As guide vane 130, the blade 130 can have a further platform (not shown) at its blade tip 415.

In the fastening region 400, a blade foot 183 which serves to fasten the rotor blades 120, 130 to a shaft or a disk is provided (not shown).

The blade foot 183 is, for example, configured as a hammer head. Other configurations as fir tree foot or swallowtail foot are possible.

The blade 120, 130 has a leading edge 409 and a trailing edge 412 for a medium which flows past the blade airfoil 406.

In the case of conventional blades 120, 130, solid metallic materials, in particular superalloys, are, for example, used in all regions 400, 403, 406 of the blade 120, 130.

Such superalloys are, for example, known from EP 1 204 776 B1, EP 1 306 454, EP 1 319 729 A1, WO 99/67435 or WO 00/44949.

The blade 120, 130 can here have been made by a casting process, also by means of directional solidification, by a forging process, by a milling process or combinations thereof.

Workpieces having a single-crystal structure or structures are used as components for machines which during operation are subjected to high mechanical, thermal and/or chemical stresses.

The manufacture of such single-crystal workpieces is carried out, for example, by directional solidification from the melt. The processes involved here are casting processes in which the liquid metallic alloy solidifies to form a single-crystal structure, i.e. to give a single-crystal workpiece, or solidifies directionally.

Here, dendritic crystals are aligned along the heat flow and form either a rod-like crystalline grain structure (columnar, i.e. grains which extend over the entire length of the workpiece and are here, in accordance with general language usage, referred to as directionally solidified) or a single-crystal structure, i.e. the entire workpiece consists of a single crystal. In these processes, the transition to globulitic (polycrystalline) solidification has to be avoided since transverse and longitudinal grain boundaries are necessarily formed by nondirectional growth, and these negate the good properties of the directionally solidified or single-crystal component.

When directionally solidified microstructures are spoken of in general, this encompasses both single crystals which have no grain boundaries or at most small-angle grain boundaries and also columnar crystal structures which have grain boundaries running in the longitudinal direction but no transverse grain boundaries. These crystalline structures mentioned second are also referred to as directionally solidified structures.

Such processes are known from U.S. Pat. No. 6,024,792 and EP 0 892 090 A1.

The blades 120, 130 can also have coatings to protect against corrosion or oxidation, e.g. (MCrAlX; M is at least one element from the group consisting of iron (Fe), cobalt (Co), nickel (Ni), X is an active element and is yttrium (Y) and/or silicon and/or at least one element of the rare earths or hafnium (Hf)). Such alloys are known from EP 0 486 489 B1, EP 0 786 017 B1, EP 0 412 397 B1 or EP 1306 454 A1.

The density is 95% of the theoretical density.

A protective aluminum oxide layer (TGO=thermally grown oxide layer) is formed (as intermediate layer or as outermost layer) on the MCrAlX layer.

The layer composition comprises Co-30Ni-28Cr-8Al-0.6Y-0.7Si or Co-28Ni-24Cr-10Al-0.6Y. Apart from these cobalt-based protective coatings, nickel-based protective layers such as Ni-10Cr-12Al-0.6Y-3Re or Ni-12Co-21Cr-11Al-0.4Y-2Re or Ni-25Co-17Cr-10Al-0.4Y-1.5Re are also used.

A thermal barrier layer can also be present on the MCrAlX and is the outermost layer and consists, for example, of $ZrO_2$, $Y_2O_3$—$ZrO_2$, i.e. it is not, partially stabilized or fully stabilized by yttrium oxide and/or calcium oxide and/or magnesium oxide.

The thermal barrier layer covers the entire MCrAlX layer. Rod-shaped grains are produced in the thermal barrier layer by suitable coating processes such as electron beam vaporization (EB-PVD).

Other coating methods are conceivable, e.g. atmospheric plasma spraying (APS), LPPS, VPS or CVD. The thermal barrier layer can have porous grains having microcracks or macrocracks to achieve better thermal shock resistance. The thermal barrier layer is thus more porous than the MCrAlX layer.

Refurbishment means that components 120, 130 may have to be freed of protective layers (e.g. by sand blasting) after use. This is followed by removal of the corrosion and/or oxidation layers or products. Cracks in the component 120, 130 may also be repaired. This is followed by recoating of the component 120, 130 and renewed use of the component 120, 130.

The blade 120, 130 can be hollow or solid. When the blade 120, 130 is to be cooled, it is hollow and optionally also has film cooling holes 418 (indicated by broken lines).

Figure 5:
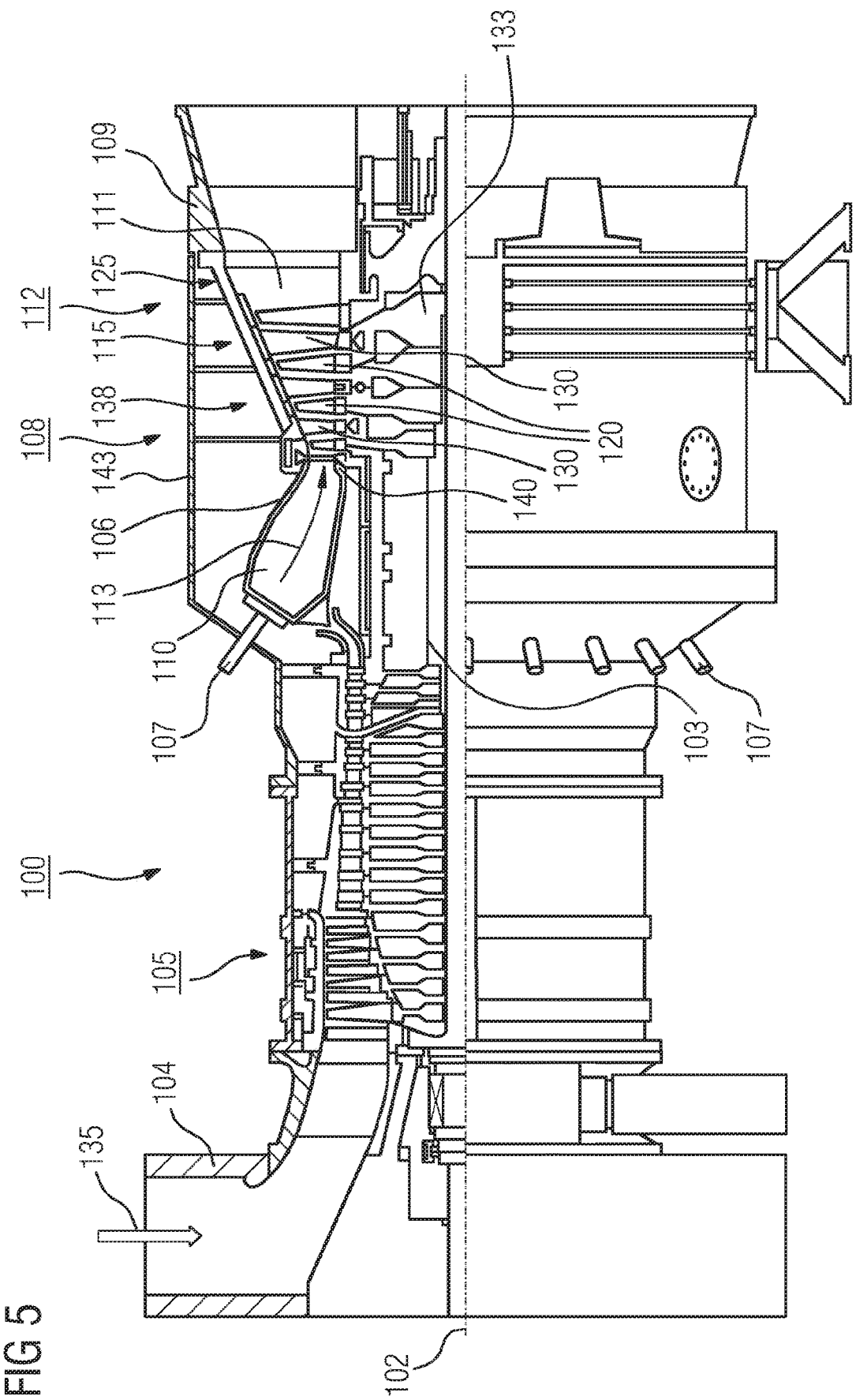
FIG. 5 shows a longitudinal partial sectional view of a gas turbine.

FIG. 5 shows, by way of example, a longitudinal partial sectional view of a gas turbine 100.

The gas turbine 100 has, in its interior, a rotor 103 mounted so as to be rotatable about an axis 102 of rotation and having a shaft 101, which is also referred to as turbine rotor.

Along the rotor 103, there are, in succession, an intake housing 104, a compressor 105, a combustion chamber which is for example a torus-like combustion chamber 110, in particular annular combustion chamber, with a plurality of coaxially arranged burners 107, a turbine 108 and the exhaust gas housing 109.

The annular combustion chamber 110 communicates with a for example annular hot gas channel 111. There, four turbine stages 112 connected in series, for example, form the turbine 108.

Each turbine stage 112 is, for example, formed by two rings of blades. Viewed in the flow direction of a working medium 113, a guide vane row 115 is followed by a row 125 formed by rotor blades 120 in the hot gas channel 111.

The guide vanes 130 are fastened to an interior housing 138 of a stator 143, while the rotor blades 120 of a row 125 are, for example, attached by means of a turbine disk 133 to the rotor 103.

A generator or a working machine (not shown) is coupled to the rotor 103.

During operation of the gas turbine 100, air 135 is sucked in through the intake housing 104 and compressed by the compressor 105. The compressed air provided at the turbine end of the compressor 105 is fed to the burners 107 and mixed with a fuel there. The mixture is then burnt in the combustion chamber 110 to form the working medium 113. From there, the working medium 113 flows along the hot gas channel 111 past the guide vanes 130 and the rotor blades 120. At the rotor blades 120, the working medium 113 is depressurized so as to impart momentum, so that the rotor blades 120 drive the rotor 103 and this drives the working machine coupled thereto.

The components which are exposed to the hot working medium 113 are subjected to thermal stresses during operation of the gas turbine 100. The guide vanes 130 and rotor blades 120 of the first, viewed in the flow direction of the working medium 113, turbine stage 112 are, in addition to the heat shield elements lining the annular combustion chamber 110, subjected to the greatest thermal stresses.

In order to withstand the temperatures prevailing there, these components can be cooled by means of a coolant.

Substrates of the components can likewise have a directional structure, i.e. they are single crystals (SX structure) or have only longitudinally aligned grains (DS structure).

As material for the components, in particular for the turbine blade 120, 130 and components of the combustion chamber 110, use is made of, for example, iron-, nickel- or cobalt-based superalloys.

Such superalloys are, for example, known from EP 1 204 776 B1, EP 1 306 454, EP 1 319 729 A1, WO 99/67435 or WO 00/44949.

The blades 120, 130 can likewise have coatings to protect against corrosion (MCrAlX; M is at least one element from the group consisting of iron (Fe), cobalt (Co), nickel (Ni), X is an active element and is yttrium (Y) and/or silicon, scandium (Sc) and/or at least one element of the rare earths or hafnium). Such alloys are known from EP 0 486 489 B1, EP 0 786 017 B1, EP 0 412 397 B1 or EP 1306 454 A1.

A thermal barrier layer which consists, for example, of $ZrO_2$, $Y_2O_3$—$ZrO_2$, i.e. it is not, partially or fully stabilized by yttrium oxide and/or calcium oxide and/or magnesium oxide, can additionally be present on the MCrAlX. Rod-shaped grains are produced in the thermal barrier layer by means of suitable coating processes, e.g. electron beam vaporization (EB-PVD).

The guide vane 130 has a guide vane foot (not shown here) facing the interior housing 138 of the turbine 108 and also has a guide vane head opposite the guide vane foot. The guide vane head faces the rotor 103 and is fixed to a fastening ring 140 of the stator 143.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A ceramic sealing system between a stator and a turbine blade of a rotor, comprising:
    the turbine blade, wherein the turbine blade has a first coating a blade airfoil of the turbine blade, wherein a zirconium oxide layer having a porosity of less than 8% is included as a second coating on the tip of the turbine blade, and wherein the first coating has a different porosity than the second coating,
    wherein the stator includes a metallic substrate, a metallic bonding layer and a thick, outer ceramic layer based on zirconium oxide having a porosity of ≥14%.

2. The ceramic sealing system as claimed in claim 1, wherein the thick, outer ceramic layer is a partially stabilized, single-layer layer having a porosity of 18%±4%.

3. The ceramic sealing system as claimed in claim 1, wherein the thick outer ceramic layer is made up of two sublayers.

4. The ceramic sealing system as claimed in claim 3, wherein an inner sublayer comprises partially stabilized zirconium oxide with a porosity of 18%±4%.

5. The ceramic sealing system as claimed in claim 3 having an outer sublayer including an at least twice as thick zirconium oxide layer.

6. The ceramic sealing system as claimed in claim 3 wherein the outer, ceramic layer is at least one of 1000 µm thick, and 1000 µm±10%.

7. The ceramic sealing system as claimed in claim 1, wherein the thick outer ceramic layer is a ceramic bonding layer based on a partially stabilized yttrium oxide layer having a porosity of 18%±4% and an outer, highly porous, at least twice as thick partially stabilized zirconium oxide layer having a porosity of 24%±3%.

8. The ceramic sealing system as claimed in claim 1, wherein the thick outer ceramic layer is a ceramic bonding layer based on a partially stabilized yttrium oxide layer having a porosity of 18%±4% and an outer, porous, at least twice as thick fully stabilized zirconium oxide layer having a porosity of 18%±4%.

9. The ceramic sealing system as claimed in claim 3, wherein the full stabilization is affected by means of yttrium oxide in a proportion of 48%.

10. The ceramic sealing system as claimed in claim 2, wherein the partial stabilization is affected by means of yttrium oxide in a proportion of 8%.

11. The ceramic sealing system as claimed in claim 1, wherein the stabilization of zirconium oxide is affected only by yttrium oxide.

12. The ceramic sealing system as claimed in claim 3, wherein the thickness of the ceramic bonding layer is at least one of in the range from 300 µm to 500 µm and 400 µm.

13. The ceramic sealing system as claimed in claim 1, wherein the layer thickness of the ceramic layers on the housing is at least one of from 1300 μm to 1500 μm and 1400 μm.

14. The ceramic sealing system as claimed in claim 1, wherein the ceramic layer on the blade tip has a thickness in the range from 50 μm to 150 μm.

15. The ceramic sealing system as claimed claim 1, wherein a ceramic layer on the blade airfoil has a layer thickness of at least 300 μm.

16. A ceramic sealing system, comprising:
a stator; and
a turbine rotor blade, wherein the turbine rotor blade has a first coating, wherein a zirconium oxide layer having a porosity of less than 8% has been applied as a second coating on a tip of the turbine rotor blade, and wherein the first coating is different than the second coating;
wherein the stator includes a metallic substrate, a metallic bonding layer, and a ceramic bonding layer based on a partially stabilized yttrium oxide layer having a porosity of 18%±4% and an outer, highly porous, at least twice as thick partially stabilized zirconium oxide layer having a porosity of 24%±3%.

17. A ceramic sealing system, comprising:
a stator; and
a turbine rotor blade, wherein the turbine rotor blade has a first coating, wherein a zirconium oxide layer having a porosity of less than 8% has been applied as a second coating on a tip of the turbine rotor blade, and wherein the first coating is different than the second coating;
wherein the stator includes a metallic substrate, a metallic bonding layer, and a ceramic bonding layer based on a partially stabilized yttrium oxide layer having a porosity of 18%±4% and an outer, porous, at least twice as thick fully stabilized zirconium oxide layer having a porosity of 18%±4%.

* * * * *